Sept. 27, 1932.  R. J. NORTON  1,879,433
FRICTION FACING
Filed Dec. 20, 1930
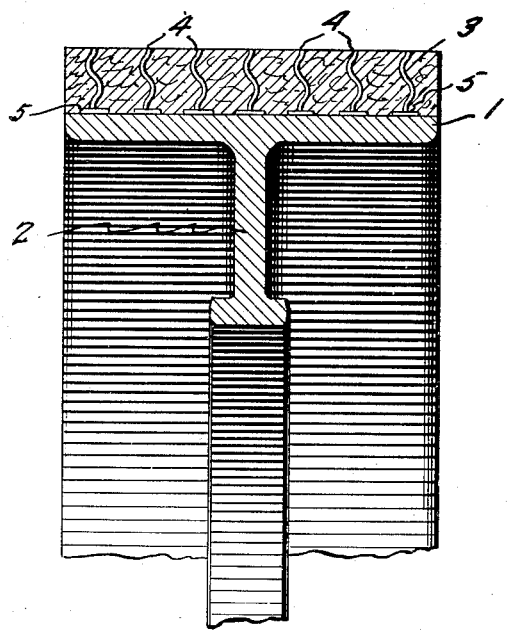
Inventor
RAYMOND J. NORTON
Semmes & Semmes
By and M. W. McConkey
Attorneys Patented Sept. 27, 1932

1,879,433

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

FRICTION FACING

Application filed December 20, 1930. Serial No. 503,852.

This invention relates to improved friction facings and more particularly to a friction facing comprising a synthetic resin.

Synthetic resins, in combination with either felted or woven asbestos, have been proposed heretofore for use in brake structures. These materials serve well as binders but are, nevertheless, subjected to certain disadvantages.

One of the major disadvantages is the low heat conductivity of such resins. The conductivity is so low that they are, in effect, substantially heat insulators. For this reason, when employed as friction facings, the generated heats of friction are not transmitted to the external metallic means and are not dissipated. This is a serious drawback when using these synthetic resins because of the fact that at high temperatures these materials suffer a loss in weight and if the temperature is too high, they carbonize.

Prior to this time, no attempt has been made to provide for the abstraction of heat from the friction surface of materials embodying synthetic resins, and to this extent these materials have not been effective in friction facings.

It is an object of the present invention to provide a novel metallic resin friction facing.

Another object is to provide an improved brake shoe structure.

Yet another object is to provide a friction facing embodying a synthetic resin so frabricated as to impart to it a relatively high thermal conductivity.

Another object is to provide a friction facing embodying a synethetic resin which has substantially the heat conductivity of metal parts.

Yet another object is to provide a novel method of transmitting heat from the frictional engaging surfaces of brake members to a radiating or other dissipating surface.

With these and other equally important objects in view, the invention comprehends the provision of a friction facing embodying a synthetic resin, such, for example, as a resin of the phenol methylene type, with which is incorporated filler materials such as fabrics of low flammability exemplified by asbestos. In these materials there is incorporated metallic members which extend from the frictional engaging surface to the metal part of the shoe so as to provide a path of high thermal conductivity from the frictional engaging surface to the dissipative surface.

The invention may readily be practiced by reacting phenol and formaldehyde in the proper proportions and in the presence of hardening agents so as to produce the infusible form of the resin.

The resin may be made up first in a fusible form and then used to impregnate either woven asbestos or felted asbestos. After this impregnation, the material may be subjected to the proper heat and pressure conditions, well known to those skilled in the art, to transform the material to the infusible form. In lieu of this phenolic condensation product, other synthetic resins may be employed such, for example, as furfural, the acetylene resins, the urea resins, and other similar synthetic products.

In accordance with the present invention, the friction facing as made up includes metallic members preferably in the form of fine wires of low abrasive quality which are permanently embodied in the friction facing and which extend transversely of the friction surface, that is to say, from the frictional engaging surface through the friction facing to the opposite side. When the friction facing is a lining member, which is to be attached to a metallic shoe, the wires are preferably extended circumferentially along the surface of the facing which is contiguous to, and which, when mounted abuts the adjacent metallic flange of the shoe. When these two members, namely, the shoe and the facing, are secured together, either by rivets or by being permanently moulded together, the wires embodied in the friction facing contact with the metal of the shoe and provide, in effect, a continuous metallic path from the heat generating surface to the heat dissipative surface. Heat may be dissipated from this member by radiation and/or convection.

As noted hereinbefore, the invention is applicable either to friction facings of the woven or of the felted type. In either case, it is necessary only to provide for the presence, during any of the steps of manufacture, of metallic wires extending from the friction surface transversely of the friction facing to the abutting surface of a brake drum or brake shoe. It will be appreciated that the total quantum of heat which is transmitted will depend upon the coefficient of thermal conductivity of the metallic transmitting medium employed, and upon the quantity of the material. For this reason, it is preferable to use copper wire of a relatively small gauge which is substantially evenly distributed over the entire frictional engaging surface of the friction facing.

To more clearly explain the invention a preferred physical embodiment is shown in the accompanying drawings. The apparatus as made up comprises a brake shoe having a braking flange 1 and an integral rigidifying web 2. The friction facing 3, which may be a woven or felted asbestos bonded with any suitable binder, is attached to the flange 1 in any desired manner, as by means of the usual rivets. The friction facing is provided with the wires 4 extending transversely through the facing from the frictional engaging surface to the braking flange 1. Adjacent the braking flange wires are preferably extended spread out so as to present large areas 5 for abutment with the flange. This provides extensive mechanical contact between the wires and the shoe and provides for a metallic conductive path for the transmission of the generated frictional heats.

The operation of the member will be readily appreciated; as a brake is applied, and as the friction facing embodying the resin exerts its braking action, frictional heats are generated. These are transmitted through the medium of the wires or other metallic inserts to the metal of the shoe. The heat then is dissipated by radiation and/or convection from the surfaces of this latter member.

It will be appreciated that with this concept in mind, a wide variety of particular facings may be made up. These may comprise relatively massive metal inserts, when the metal is relatively soft, or may comprise, as described, relatively fine wires. When fine wires are employed, the problem of differential expansion of the metal and the resin of the friction facing is largely minimized due to the actual negligible expansion of the small cross section wire.

Therefore, while a particular embodiment of the invention has been described, it is to be understood that this is merely illustrative of the novel principle here involved, namely, of providing a friction material embodying, at least in part, a synthetic resin or other material of low thermal conductivity but which is so formed as to provide a member having a thermal conductivity approximating that of a metal structure.

I claim:

1. A brake member comprising a brake shoe, a bonded asbestos lining secured to the shoe and a highly heat conductive means embodied in the lining to transmit generated frictional heat from the frictional engaging surface to the shoe.

2. A brake member comprising a metallic shoe, a friction facing attached to the shoe, said facing having metal wires embodied therein extending from the exposed frictional engaging surface of the facing through the facing and contacting with the shoe to transmit generated frictional heat from the frictional engaging surface to the shoe.

3. A brake member comprising a metallic backing member serving as a brake shoe, a synthetic resin facing attached to the shoe, said facing having paths of high heat conductivity extending from the frictional engaging surface to the shoe.

4. A brake member comprising a metallic backing member serving as the non-rotative brake element, a friction facing of negligible heat conductivity attached to the shoe and a multitude of paths of high heat conductivity substantially uniformly distributed through the facing and extending continuously, transversely through the facing from the frictional engaging to the shoe engaging faces.

5. A brake shoe having a friction facing thereon having a material of negligible thermal conductivity but having a large number of metallic wires extending transversely through the facing to rapidly conduct heat away from the frictional engaging surface of the facing and transmit it by reason of mechanical contact to the metal of the shoe.

6. A brake shoe having a friction facing attached thereto, a plurality of metal wires contacting with the shoe and extending therefrom through the facing to the exposed frictional engaging surface thereof to transmit generated frictional heat from the frictional engaging surface to the shoe.

7. A brake shoe having an attached friction facing, metal members contacting with the shoe and extending through the facing to an exposed position on the frictional engaging surface of the facing to transmit generated frictional heat from the frictional engaging surface to the shoe.

In testimony whereof, I have hereunto signed my name.

RAYMOND J. NORTON.